United States Patent
Kim et al.

(10) Patent No.: US 10,281,595 B2
(45) Date of Patent: May 7, 2019

(54) METHOD AND APPARATUS FOR DISTINGUISHING RADIONUCLIDE BY USING PLASTIC SCINTILLATOR

(71) Applicant: KOREA INSTITUTE OF NUCLEAR SAFETY, Daejeon (KR)

(72) Inventors: Hong Suk Kim, Daejeon (KR); Chang-Su Park, Daejeon (KR); Chang-il Choi, Daejeon (KR); Chul Hee Min, Wonju-si (KR); Wook-Geun Shin, Wonju-si (KR); Hyun-Cheol Lee, Wonju-si (KR); Jeong Wan Kwon, Daejeon (KR); Hyungjoon Yu, Daejeon (KR); Ah Reum Kim, Daejeon (KR); Hyeon-Jun Choi, Daejeon (KR); Hyunseok Lee, Daejeon (KR)

(73) Assignee: KOREA INSTITUTE OF NUCLEAR SAFETY, Daejeon (KR)

( * ) Notice: Subject to any disclaimer, the term of this patent is extended or adjusted under 35 U.S.C. 154(b) by 55 days.

(21) Appl. No.: 15/527,887

(22) PCT Filed: May 11, 2015

(86) PCT No.: PCT/KR2015/004696
§ 371 (c)(1),
(2) Date: May 18, 2017

(87) PCT Pub. No.: WO2016/080610
PCT Pub. Date: May 26, 2016

(65) Prior Publication Data
US 2018/0284296 A1    Oct. 4, 2018

(30) Foreign Application Priority Data
Nov. 19, 2014 (KR) ........................ 10-2014-0161608

(51) Int. Cl.
*G01T 1/00* (2006.01)
*G01T 1/203* (2006.01)
(Continued)

(52) U.S. Cl.
CPC ............ *G01T 1/203* (2013.01); *G01T 1/1663* (2013.01); *G01T 1/362* (2013.01); *G01V 5/0075* (2013.01)

(58) Field of Classification Search
CPC ....... G01T 1/20; G01T 1/2006; G01T 1/2008; G01T 1/201; G01T 1/2012; G01T 1/2018; G01T 1/202; G01T 1/203; G01T 1/204
See application file for complete search history.

(56) References Cited

U.S. PATENT DOCUMENTS

| 4,075,480 A * | 2/1978 | Horrocks .............. G01T 1/2045 250/328 |
| 2008/0128631 A1 | 6/2008 | Suhami |

(Continued)

FOREIGN PATENT DOCUMENTS

| KR | 10-2005-0097294 A | 10/2005 |
| KR | 10-2008-0015497 A | 2/2008 |
| KR | 10-2010-0033175 A | 3/2010 |

*Primary Examiner* — David P Porta
*Assistant Examiner* — Mamadou Faye
(74) *Attorney, Agent, or Firm* — Novick, Kim & Lee, PLLC; Jae Youn Kim (57) ABSTRACT

A method and an apparatus for distinguishing radionuclides are disclosed. The method comprises the steps of: receiving energy generated in one or more radioactive elements; applying energy as a weight for each channel to spectrum of the received energy; and distinguishing the one or more radioactive elements on the basis of the spectrum of the spectrum to which the weight is applied. A radioactive element having an energy value corresponding to a peak value of the spectrum of the energy to which the weight is applied, as an energy value of a Compton edge, is distin- (Continued)

guished as the one or more radioactive elements. According to the present invention, it is possible to more accurately monitor radiation even while using a plastic scintillator, and further to improve energy resolution of a plastic scintillator.

15 Claims, 13 Drawing Sheets

(51) Int. Cl.
*G01T 1/166* (2006.01)
*G01T 1/36* (2006.01)
*G01V 5/00* (2006.01)

(56) References Cited

U.S. PATENT DOCUMENTS

2008/0191887 A1\* 8/2008 Mullikin ................. G01T 1/167
340/600
2014/0001365 A1 1/2014 Akers et al.
2017/0050046 A1\* 2/2017 Walder ................... A61N 5/062

\* cited by examiner

METHOD AND APPARATUS FOR DISTINGUISHING RADIONUCLIDE BY USING PLASTIC SCINTILLATOR

TECHNICAL FIELD

The present invention relates to a method and an apparatus for distinguishing radionuclides, and more specifically, for distinguishing radionuclides through a plastic scintillation detector which uses a plastic scintillator.

BACKGROUND ART

An unstable nucleus performs nuclear disintegration many times to be a stable nucleus. In this case, the nucleus emits alpha-ray, beta-ray, and gamma-ray with specific energy.

A radionuclide detector is an apparatus which measures and analyzes energy of radiation generated from a substance including an unknown radionuclide to distinguish a unique radionuclide constituting the substance.

A scintillator used in a radionuclide detector has a property of emitting light when receiving energy. By measuring the amount of light generated by radiation, it is possible to confirm energy of the incident radiation. When the scintillator receives radiation with higher energy, the scintillator generates a larger amount of light. For example, polyvinyl toluene (PVT) scintillator generates 10,000 photon/MeV.

As radionuclide detectors, there are a detector using a plastic scintillator and a detector using an inorganic scintillator.

In a case of the scintillation detector using an inorganic scintillator (for example, NaI(TI) or CsI(TI)), a ratio in which a photoelectric effect of absorbing all energy of gamma-ray occurs is high, and energy resolution is excellent. Accordingly, it is possible to easily analyze a radionuclide on the basis of energy of a photo peak. However, since costs are high, it is difficult to be applied to a large-scale detector.

In the radionuclide detector using a plastic scintillator (or another kind of organic scintillator), a photoelectric effect rarely occurs, and energy resolution is relatively low. Conventionally, an energy window has been used in which only the amount of radiation transferred to a detector is measured using a gross counting method, or in specific field, several energy areas corresponding to target nuclides are set to interest areas and the amount of radiation measured in each area is evaluated to analogize nuclides. In other words, a group including nuclides with similar energy has been analogized rather than analyzing nuclides themselves.

This method has many limits due to restrictive energy resolution and statistic error when energy difference between nuclides is not large. For example, a radiation monitor for detecting inflow of illegal radioactive substances at the airport or harbor needs a large-area detector. However, a conventional radiation monitor using a plastic scintillator does not distinguish $^{137}$Cs and $^{214}$Bi (0.662 MeV and 0.609 MeV, respectively) which are an artificial radionuclide and a natural radionuclide, and does not distinguish $^{60}$Co and $^{40}$K (1.332 MeV and 1.505 MeV, respectively). In this case, flow of distribution is disturbed, and also a harmful effect in economical aspect is significant such as causing loss of manpower due to additional secondary inspection.

In the present invention, a method and an apparatus for distinguishing radionuclides by applying a weight to energy spectrum of radiation obtained using a plastic scintillator are proposed. In addition, this method is simulated by Monte Carlo simulation to verify the effect.

CITATION LIST

Patent Literature

[Patent Literature 1]
Korean Laid-Open Patent Publication No. 2010-0033175

SUMMARY OF PRESENT INVENTION

Technical Problem

A technical object of the present invention is to provide a method and an apparatus for distinguishing radionuclides in a radiation monitor using a plastic scintillator.

Solution to Problem

According to an aspect of the present invention, a method for distinguishing radionuclides includes the steps of: receiving energy generated in one or more radioactive elements; applying energy as a weight for each channel to spectrum of the received energy; and distinguishing the one or more radioactive elements on the basis of the spectrum to which the weight is applied. The radioactive element having an energy value corresponding to a peak value of the spectrum of the energy to which the weight is applied as an energy value of a Compton edge is distinguished as the one or more radioactive elements.

Advantageous Effects of Present Invention

According to the present invention, it is possible to more accurately monitor radiation even while using a plastic scintillator, and further, it is possible to improve energy resolution of a plastic scintillator.

DESCRIPTION OF EMBODIMENTS

Hereinafter, embodiments of the present invention will be described in detail with reference to the accompanying drawings, for persons skilled in the art to easily carry out the embodiments. However, the present invention can be embodied in various forms, and is not limited to the embodiments disclosed hereinafter. In addition, in the drawings, parts irrelevant to the present invention are omitted to clearly describe the present invention, the same or similar reference numerals and signs in the drawings represent the same or similar constituent elements.

The objects and effects of the present invention will be naturally understood or further clarified by the following description, and the objects and effects of the present invention are not limited only by the following description.

The objects, features, and advantages of the present invention will be clarified through the following detailed description. In addition, in describing the present invention, when specific description about the prior art related to the present invention may unnecessarily blur the gist of the present invention, detailed description thereof is omitted. Hereinafter, embodiments according to the present invention will be described in detail with reference to the accompanying drawings.

A plastic scintillator is inexpensive, its processing is easy to be made into desired shape and size, and is suitable for a detector with a large area. Meanwhile, the plastic scintillator has low density, which makes its detection efficiency for high-energy gamma-ray low, has low probability of photoelectric effect of transferring all energy of radiation happening, and has high probability of most of radiation being Compton-scattered. Accordingly, when energy difference between nuclides is not large due to energy resolution, it is difficult to analyze nuclides.

For example, as shown in the following table, several nuclides according to energy ranges can be analyzed into groups.

TABLE 1

|  | Group 1 | Group 2 | Group 3 | Group 4 | Group 5 |
| --- | --- | --- | --- | --- | --- |
| Energy range [MeV] | 0.02 to 0.13 | 0.13 to 0.30 | 0.30 to 0.60 | 0.60 to 1.20 | 1.20 to 3.00 |

Referring to Table 1, nuclides can be analyzed into one of groups 1 to 5 in accordance with energy ranges of nuclides, but it is difficult to accurately distinguish what radioactive elements are.

Figure 1:
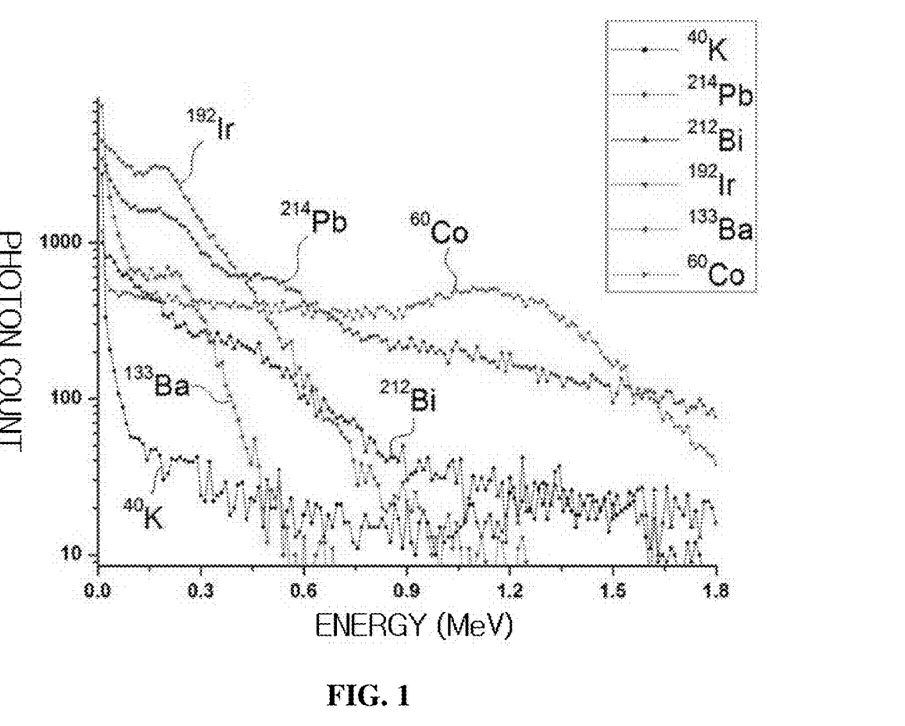
FIG. 1 is an example of a graph illustrating photon counts for energy in a plastic scintillator.

FIG. 1 is an example illustrating photon counts for energy in a plastic scintillator. A photon count represents the frequency in which the amount of photons corresponding to each channel bin is counted (for example, 1 radiation represents a photon bunch, which is the amount of photons entering PMT).

Referring to FIG. 1, in a plastic scintillator, a photoelectric effect rarely occurs, and thus a large short circuit occurs after (for example, $^{60}$Co) Compton edge.

Hereinafter, Compton effect represents a phenomenon that change to the side longer than a wavelength of an incident X-ray is included in an X-ray scattered by a substance. Simultaneously, electrons bouncing off from atoms are ejected. Compton scattering represents a phenomenon that photons of X-ray or γ-ray collide with electrons in atoms or free electron of a substance, a part thereof is given to electrons and bounces off, the photons become photons with energy as low as that given to the electrons, that is, photons with low frequency, and scattered in a direction different from the direction of first incidence. In this case, the bounced-off electrons are called Compton electrons. Compton edge is that a part of γ-ray is represented by Compton effect. In other words, Compton edge means a portion with a steep gradient corresponding to maximal Compton electron energy in energy distribution of compton electron.

From now on, the present invention proposes a method for precisely distinguishing energy of incident gamma-ray and determining radionuclides even while using a plastic scintillator, and a radiation monitor using the same.

Figure 2:
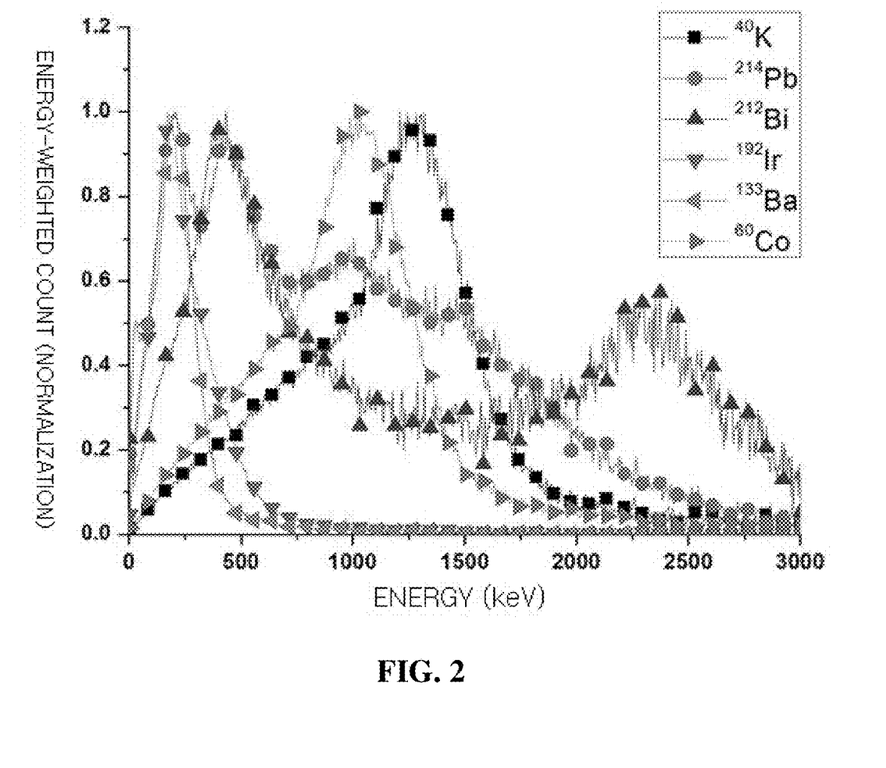
FIG. 2 is an example of energy spectrum to which energy-weighted counts are applied according to the present invention.

FIG. 2 is an example of energy spectrum to which energy-weighted counts are applied according to the present invention.

Referring to FIG. 2, a value obtained by multiplying a photon count corresponding to each energy bin value by an energy representative value is y, and energy is an x value.

Compared with the energy spectrum of FIG. 1, a part corresponding to the short circuit in FIG. 1 is represented in a peak form in FIG. 2.

The short circuit portion in FIG. 1, that is, the peak portion in FIG. 2 corresponds to Compton edge.

As described above, the energy spectrum of gamma-ray measured through a plastic scintillator shows continuous distribution from low energy to the maximum energy (e.g. Compton edge) which may be generated by Compton scattering. Compton edge is generated at specific energy in accordance with energy of gamma-ray, and it is possible to distinguish radionuclides on the basis of energy at which Compton edge is generated.

In other words, a peak value of energy-weighted counts of gamma-ray is determined as energy of Compton edge of the corresponding radionuclide. Since it is easier to confirm the peak value, energy weight is applied to energy spectrum of gamma-ray.

Figure 3:
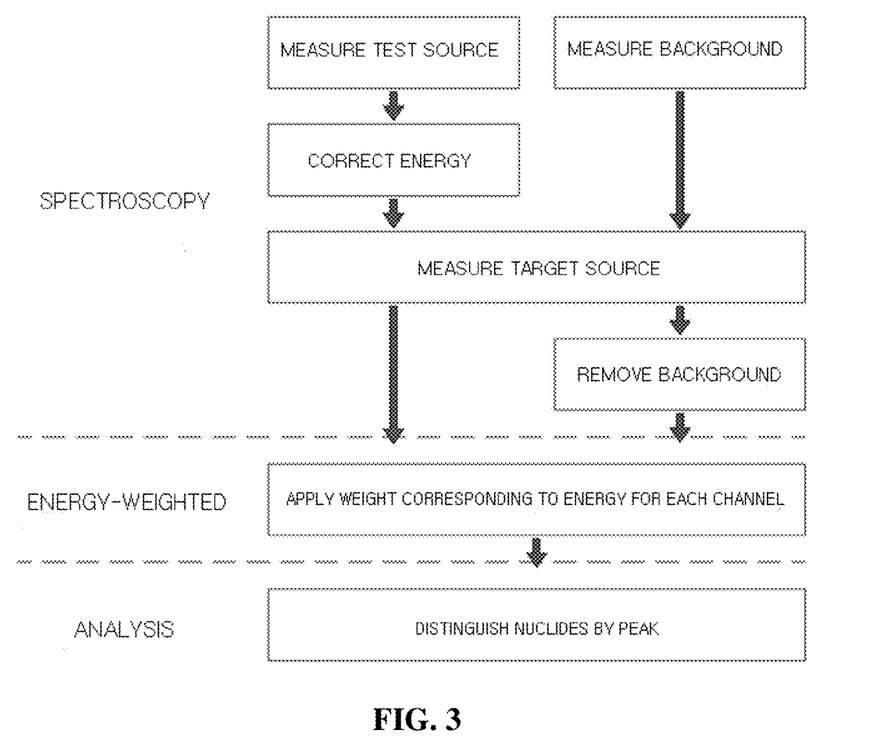
FIG. 3 is a flowchart illustrating an example of a method for distinguishing radionuclides according to the present invention.

FIG. 3 is a flowchart illustrating an example of a method for distinguishing radionuclides according to the present invention.

Referring to FIG. 3, each of a test source and a background is measured in a spectroscopy level, energy is corrected with respect to the measured test source, and a target source is measured on the basis of the measured background. Thereafter, the background is removed S300. In the spectroscopy level, energy spectrum of gamma-ray generated in an arbitrary radioactive element is obtained. For example, the corresponding energy spectrum may be a graph in which an energy value is an X axis and a photon count value is a y axis.

A weight corresponding to energy for each channel is applied on the basis of the energy spectrum obtained in the spectroscopy level S310. Accordingly, it is possible to obtain energy-weighted counts. For example, energy-weighted counts may be a graph in which an energy value is an x axis and an energy photon count value is a y axis.

Radionuclides are distinguished on the basis of the weight-applied result S320 (for example, energy-weighted counts). For example, energy (x value) corresponding to a peak value of energy-weighted counts is confirmed and, when the confirmed energy is confirmed as energy of Compton edge of a specific radioactive element, the corresponding radioactive element is distinguished as a specific radionuclide.

In short, an energy weight is applied to energy spectrum of an arbitrary radioactive element to confirm energy of Compton edge of the corresponding radioactive element. Since radioactive elements have predetermined energy of Compton edge, it is possible to distinguish radionuclides.

Figure 4:
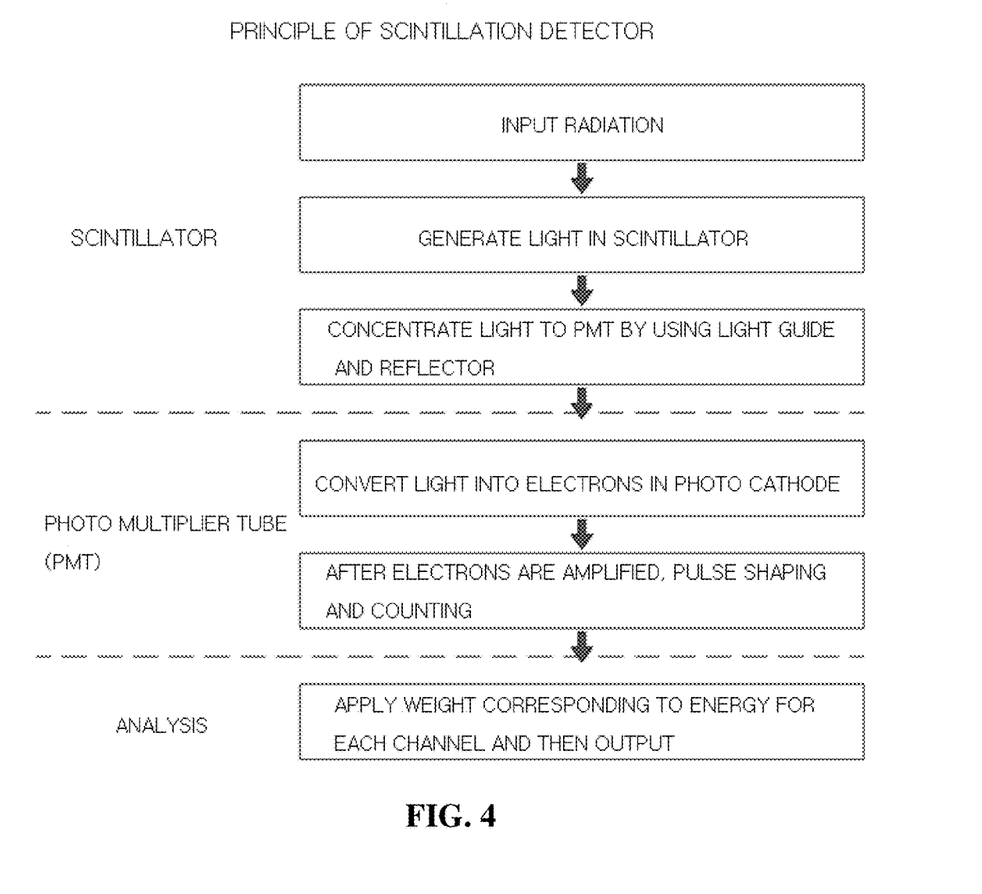
FIG. 4 is a flowchart explaining a principle of a scintillation detector to which the present invention is applied.

FIG. 4 is a flowchart explaining a principle of a scintillation detector to which the present invention is applied.

Referring to FIG. 4, in a scintillator level, when radiation is input to a scintillator, light is generated in the scintillator, and the generated light is concentrated by using a light guide and a reflector S400.

Subsequently, in a photo-multiplier tube (PMT) level, light concentrated in a photo cathode is converted into electrons, the converted electrons are amplified, then pulse shaping is performed thereon, and the electrons are counted S410.

Subsequently, a weight corresponding to energy is applied for each channel, and values thereof are output S420. It is possible to distinguish radionuclides on the basis of energy corresponding to the peak value of the output values. For example, a radioactive element in which energy corresponding to a peak value corresponds to energy of Compton edge is distinguished as a radionuclide of the corresponding energy spectrum.

Figure 5:
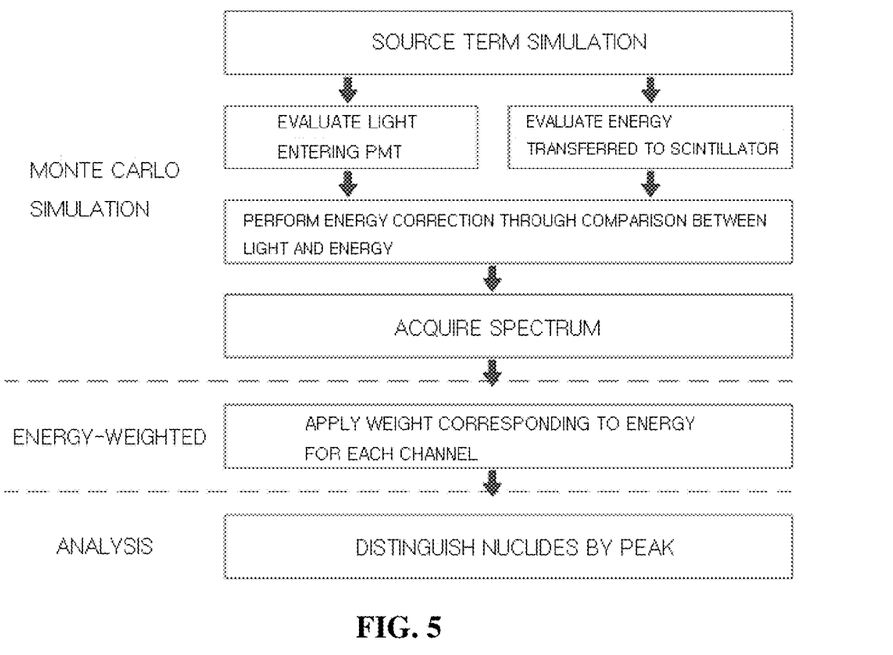
FIG. 5 is a flowchart illustrating an example of verifying a method for distinguishing radionuclides according to the present invention.

FIG. 5 is a flowchart illustrating an example of verifying the method for distinguishing radionuclides according to the present invention.

Referring to FIG. 5, source term simulation is performed by Monte Carlo simulation, light entering PMT is evaluated and simultaneously energy transferred to a scintillator is evaluated, energy correction is performed through comparison between light and energy, and energy spectrum is acquired S500. For example, when light (10,000 photon/1 MeV) is generated in accordance with energy transferred by reaction between radiation and a scintillation, channels are divided by the number of photons collected by a photomultiplier, and the energy transferred by radiation is compared with the number of collected photons to perform energy correction.

A weight corresponding to energy for each channel is applied to the acquired energy spectrum S510.

With respect to the weight-applied energy spectrum, a radionuclide in which energy of a peak value corresponds to energy of Compton edge is distinguished S520.

Herein, Monte Carlo simulation is an example of a method for verifying energy spectrum. Monte Carlo method is a method of simulating a stochastic influence of radiation by using random numbers.

Figure 6:
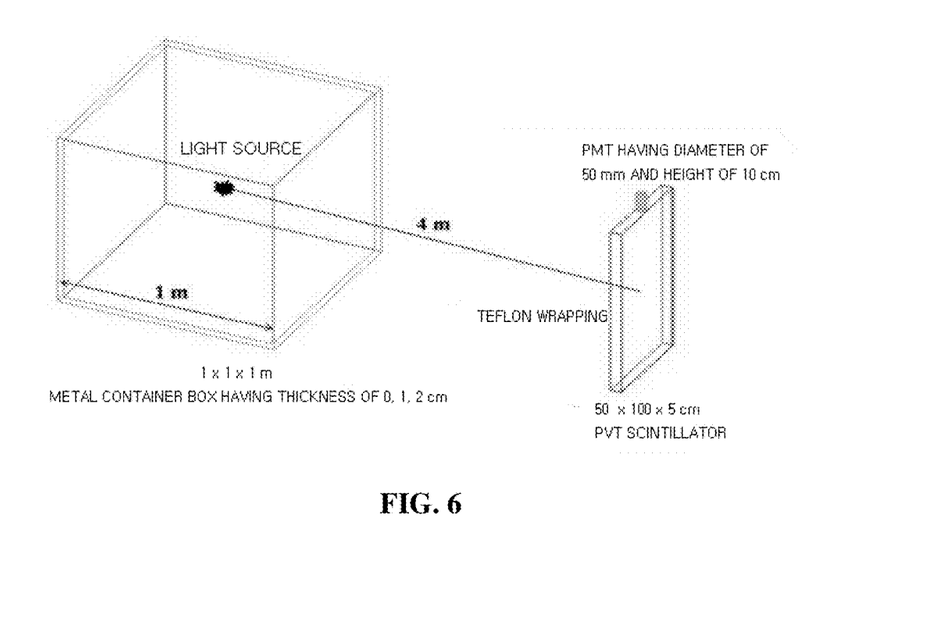
FIG. 6 is a diagram explaining Monte Carlo simulation.

FIG. 6 is a diagram explaining Monte Carlo simulation.

Referring to FIG. 6, this method is a method for simulating a stochastic influence of radiation by generating random numbers, and is utilized and verified in fields of space science, reactor, radiation diagnosis, therapy, and the like.

A source was positioned at a distance of 4 m from a Teflon-wrapped PVT scintillator, simulation was performed, and in order to know an influence by a scattering factor, simulation was also performed for containers with thicknesses of 1 and 2 cm.

In the present invention, evaluation for total six nuclides of three natural nuclides ($^{40}$K, $^{214}$Pb, and $^{212}$Bi) and three artificial radionuclides ($^{192}$Ir192, $^{60}$Co, and $^{133}$Ba) was performed at a distance of 4 m from a polyvinyl toluene (PVT) scintillator of 50*100*5 cm$^3$.

Figure 7:
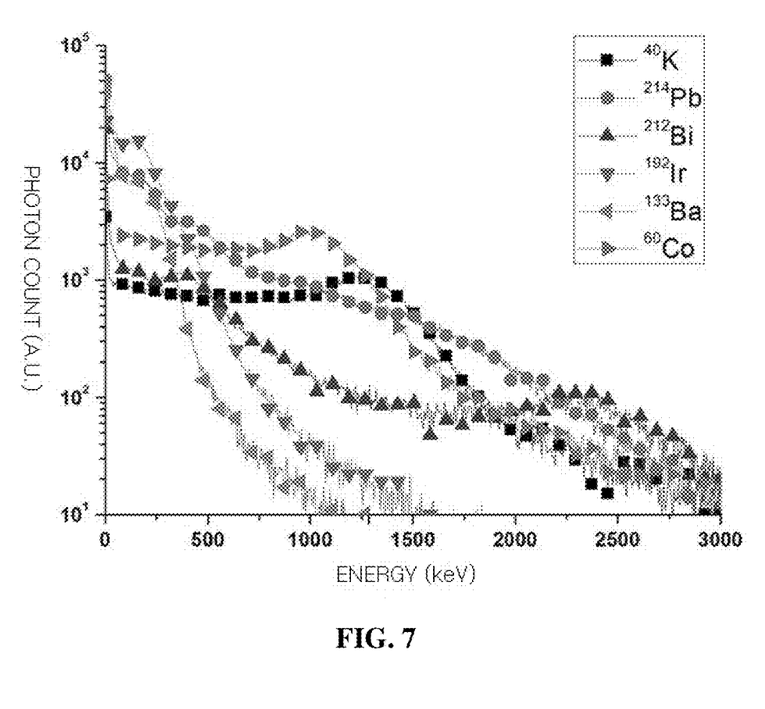
FIG. 7 and FIG. 8 are diagrams illustrating simulation results verified through Monte Carlo simulation when the present invention is not applied and when the present invention is applied, respectively.
Figure 8:
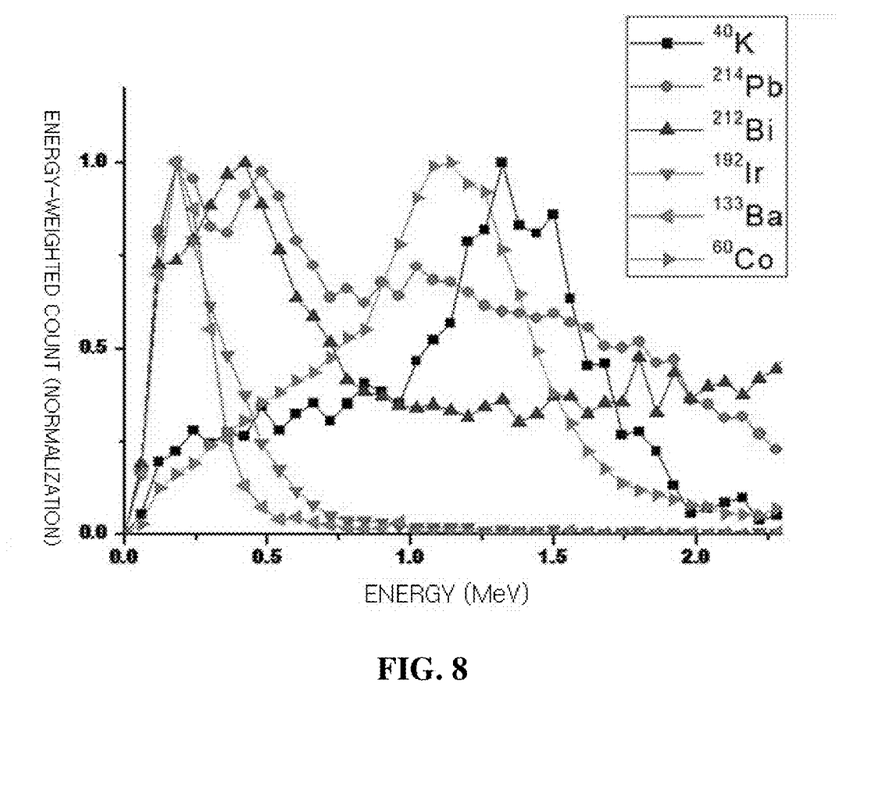

FIG. 7 and FIG. 8 are drawings illustrating simulation results verified through Monte Carlo simulation when the present invention is not applied and when the present invention is applied, respectively. FIG. 7 is about energy spectrum to which the algorithm of the present invention is not applied, and FIG. 8 is about energy-weighted counts to which the algorithm of the present invention is applied.

Referring to FIG. 8, peak values different from each other correspond to radioactive elements different from each other, respectively. An energy (x axis) value corresponding to each peak value is compared with energy of Compton edge in Table 2. In this case, it is possible to distinguish radionuclides having energy of Compton edge corresponding to energy of a peak value.

TABLE 2

| | NUCLIDE NAME | | | | | |
|---|---|---|---|---|---|---|
| | $^{40}$K | $^{214}$Pb | $^{212}$Bi | $^{192}$Ir | $^{133}$Ba | $^{60}$Co |
| Representative gamma energy [MeV] | 1.460 | 0.352 | 0.727 | 0.316 | 0.356 | 1.332 |
| Energy of Compton edge corresponding to gamma energy [MeB] | 1.243 | 0.204 | 0.538 | 0.175 | 0.207 | 1.118 |

However, since $^{232}$Bi does not release radiation, $^{212}$Bi in the above table means gamma energy and energy of Compton energy of $^{208}$Ti.

Referring to Table 2, energy of Compton edge of Table 2 corresponding to an energy-weighted count having a peak value at about 1.1 MeV in FIG. 8 is 1.118 MeV. In other words, it is possible to confirm that the corresponding energy-weighted count is about radioactive element $^{60}$Co. In other words, when an energy-weighted count having a peak at about 1.1 MeV in a scintillation detector is obtained, it is possible to distinguish that it is a $^{60}$Co nuclide.

As described above, when energy-weighted values are applied to energy spectrum for each nuclide calculated through Monte Carlo simulation according to the present invention, it is possible to know that a peak value (maximum value) is confirmed at Compton edge of each radionuclide.

According to the present invention, it is possible to distinguish radionuclides by dividing them by specific energy, not by energy groups, as illustrated in Table 1. It is possible to more accurately distinguish radionuclides by using only data acquisition, even while using a plastic scintillator and not an expensive inorganic scintillator.

Figure 9:
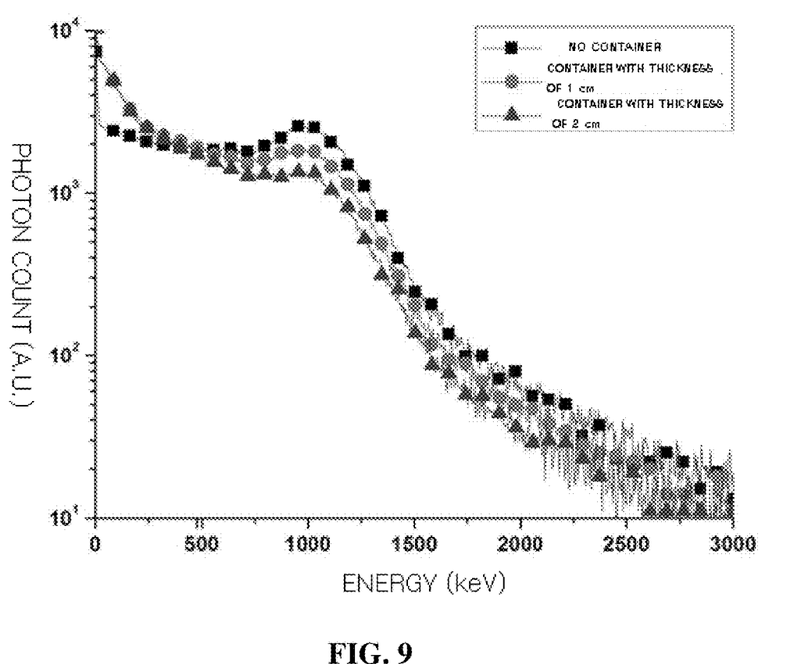
FIG. 9 and FIG. 10 are diagrams illustrating other simulation results verified through Monte Carlo simulation when an algorithm of the present invention is not applied and when an algorithm of the present invention is applied, respectively.
Figure 10:
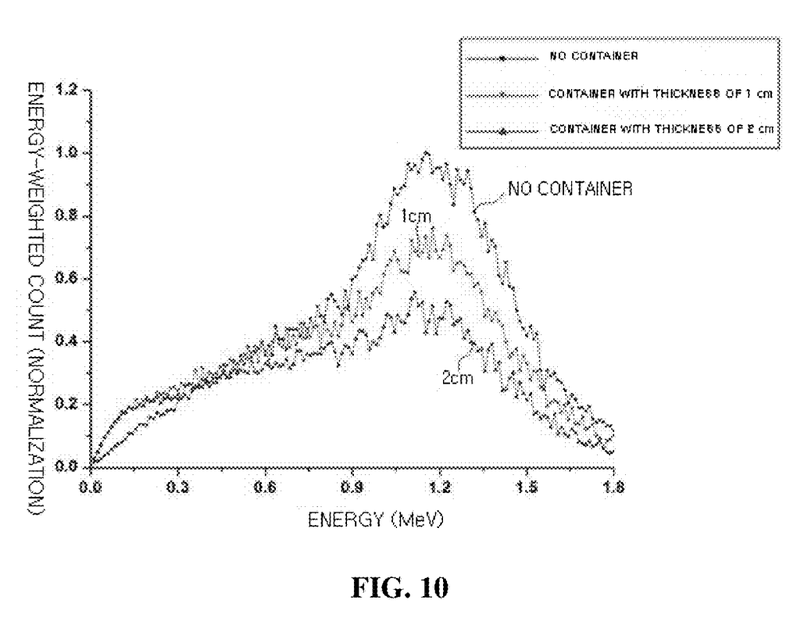

FIG. 9 and FIG. 10 are drawings illustrating other simulation results verified through Monte Carlo simulation when an algorithm of the present invention is not applied and when an algorithm of the present invention is applied, respectively, wherein a case where there are radiation sources in containers with thicknesses of 1 and 2 cm is simulated in order to know an influence by a scattering factor.

FIG. 9 is about energy spectrum to which an algorithm of the present invention is not applied, and FIG. 10 is about energy-weighted counts to which an algorithm of the present invention is applied.

Referring to FIG. 10, in all cases where there is no container, there is a radiation source in a container with a thickness of 1 cm, and there is a radiation source in a container with a thickness of 2 cm, it can be known that a radionuclide has a peak value at about 1.3 MeV.

Referring to Table 2, a case of having a peak value at about 1.3 MeV is $^{40}$K having energy of Compton edge which is 1.287 MeV. Accordingly, the radionuclide is distinguished as $^{40}$K.

A peak is generated at Compton edge of a radionuclide irrespective of thicknesses of containers, and it can be confirmed that there is no influence by a scattering factor.

The present invention is to detect a specific radionuclide in a radiation source moving in a harbor or the like, and thus a specific radionuclide has to be detected even in a moving source.

Figure 11:
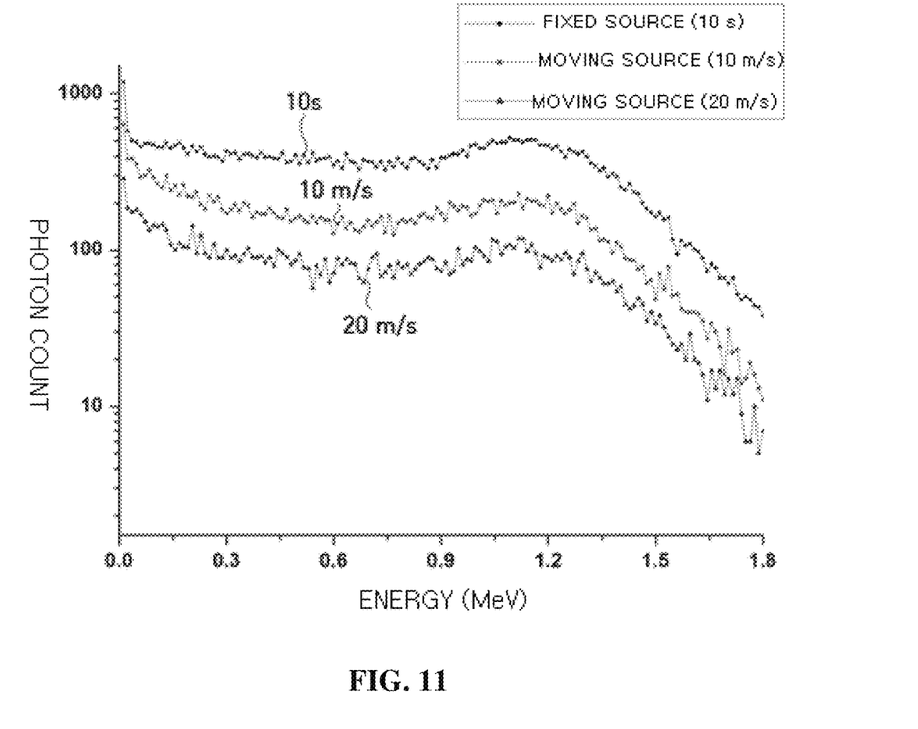
FIG. 11 and FIG. 12 are diagrams illustrating simulation results obtained by verifying an algorithm applied result of the present invention through Monte Carlo simulation when a source is moved.

FIG. 11 is a diagram illustrating a simulation result obtained by verifying a photon count of a radiation source through Monte Carlo simulation without applying an algorithm of the present invention when a light source is moving.

Figure 12:
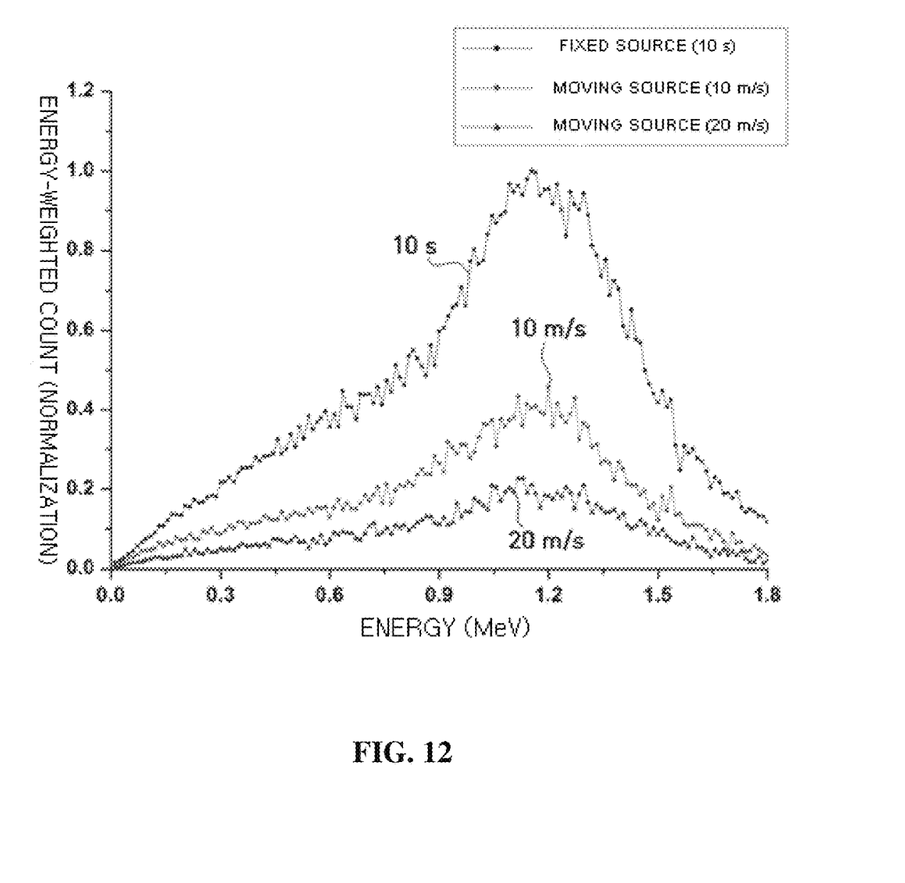

FIG. 12 is a diagram illustrating a simulation result obtained by verifying an energy-weighted count through Monte Carlo simulation by applying an algorithm of the present invention.

Referring to FIG. 12, although there is a difference in absolute values of peaks in accordance with a movement speed of a source, it can be known that a peak is generated at Compton edge of a specific radionuclide.

The method for distinguishing radioactive elements has been described by way of example in FIG. 1 to FIG. 13, but the corresponding method is not limited to the usage for distinguishing radioactive elements, and may be used as a method for improving energy resolution of an organic scintillator such as a plastic scintillator.

Figure 13:
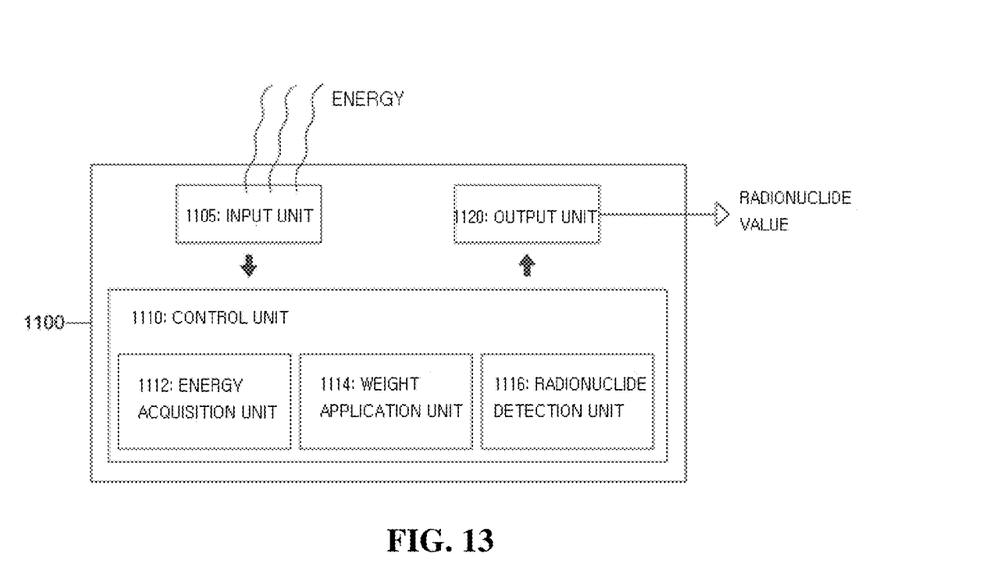
FIG. 13 is a block diagram illustrating an example of a radiator monitor according to the present invention.

FIG. 13 is a block diagram illustrating an example of a radiation monitor (or an apparatus for distinguishing radionuclides) according to the present invention.

Referring to FIG. 13, a radiation monitor 1100 includes an input unit 1105, a control unit 1110, and an output unit 1120.

The input unit 1105 receives energy.

The input unit 1105 may include an inorganic scintillator (e.g. a plastic scintillator) or an organic scintillator.

The input unit 1105 may transfer light, which is released by receiving energy through the scintillator, to the control unit 1110.

In addition, when the input unit 1105 receives energy and transfers the energy to the control unit 1110, the control unit 1110 includes a scintillator and may release light.

The control unit 1110 may include an energy spectrum acquisition unit 1112, a weight application unit 1114, or a radionuclide detection unit 1116.

The energy spectrum processing unit 1112 may obtain energy spectrum on the basis of the light released from the scintillator. The energy spectrum may be a graph in which an x axis is an energy value and a y axis is a photon count value.

The weight application unit 1114 may apply a weight corresponding to energy for each channel to energy spectrum. For example, a weight-applied spectrum may be an energy-weighted count. The energy-weighted count may be a spectrum graph in which an x axis is an energy value and a y axis is an energy-photon count value.

In addition, the energy spectrum processing unit 1112 may immediately acquire weight-applied energy spectrum.

The radionuclide detection unit 1116 distinguishes a peak value of weight-applied energy spectrum, and compares energy (e.g. MeV) of the corresponding peak value with energy of Compton edge of radioactive elements. The radionuclide detection unit 1116 distinguishes a radionuclide in which energy of the corresponding peak value is equal to or substantially similar to an energy value of Compton edge, and transfers the radionuclide to the output unit. The distinguished radioactive element may be one, and may be a group including a plurality of elements having similar energy.

The radiation monitor 1100 may further include a memory (not illustrated), and the memory may store energy values of Compton edge of radioactive elements. In this case, the radionuclide detection unit 1116 may distinguish radioactive elements corresponding to energy of peak value measured on the basis of energy values of Compton edges of radioactive elements stored in the memory.

The output unit 1120 outputs the distinguished radioactive element. For example, the output unit includes a display and may output the distinguished radioactive element information.

The radiation monitor (1100) may be a scintillation detector.

The present invention has the following advantages, and marketability is also expected.

In order to restrict inflow of illegal radioactive materials around the world, a large-area radiation monitoring system is used in airports and harbors, and in most cases, plastic detectors which are not sensitive to change in temperature and humidity and are inexpensive in installation costs have been used.

Although development of a radiation monitor using NaI (TI) which is an inorganic scintillator and a high-purity germanium detector has been tried, but it has not been put to practical use due to high costs 10 times or more.

As of 2012, ten radiation monitors have been operated at four harbors (Incheon Harbor, Busan Harbor, Gwangyang Harbor, and Pyeongtaek Harbor) in Korea, and have been used to systematically manage distribution of materials and products containing natural radionuclides and to prevent materials containing illegal artificial radionuclides from flowing into the country in accordance with Act on Protective Action Guidelines against Radiation in the Natural Environment.

It is emerging as an important issue to block inflow of illegal radionuclides and nuclear terrorism using them around the world, and it is expected that the nuclide analysis algorithm using a plastic scintillator according to the present invention can replace an indefinite nuclide analysis algorithm of the existing radiation monitor based on gross counting and energy window methods.

In addition, the method for distinguishing radionuclides according to the present invention can be usefully used to improve energy resolution of plastic scintillators which is used in various fields as well as radiation monitors.

Persons skilled in the art can variously replace, modify, and change the present invention within the scope which does not deviating from the technical spirit of the present invention, and thus the present invention is not limited by the above-described embodiments and accompanying drawings.

In the above-described exemplary system, the methods have been described on the basis of a flowchart as blocks or a series of steps, but the present invention is not limited to sequence of steps, and some steps may occur by steps and sequence different from above description or simultaneously. In addition, persons skilled in the art will understand that steps represented in the flowchart are not exclusive and another step may be included or one or more steps of the flowchart may be omitted without affecting the scope of the present invention.

INDUSTRIAL APPLICABILITY

According to the present invention, it is possible to more accurately monitor radiation even while using a plastic scintillator.

Moreover, it is possible to improve energy resolution of a plastic scintillator.

The invention claimed is:

1. A method for distinguishing radionuclides, comprising:
receiving energy generated from one or more radioactive elements;
applying a weight for each channel to spectrum of the received energy; and
distinguishing the radionuclides of the one or more radioactive elements on a basis of the spectrum of the energy to which the weight is applied,
wherein a radioactive element having an energy value of a peak value in the spectrum of the energy, corresponding to an energy value of Compton edge, is determined as one of the radionuclides,
wherein, in the spectrum of the energy to which the weight is applied, an x axis signifies the energy value of the one or more radioactive elements and an y axis signifies a value obtained by multiplying the energy value of the one or more radioactive elements by a photon count.

2. The method for distinguishing radionuclides according to claim 1, wherein the energy value of the peak value is an x axis value in the spectrum of the energy to which the weight is applied.

3. The method for distinguishing radionuclides according to claim 1, wherein the energy generated from the one or more radioactive elements is distinguished by energy of gamma-ray generated from the one or more radioactive elements.

4. The method for distinguishing radionuclides according to claim 1, wherein the spectrum of the energy is obtained by measuring each of a test source and a background, correcting the energy with respect to the measured test source, measuring a target source on a basis of the measured background, and removing the background.

5. The method for distinguishing radionuclides according to claim 1, wherein, in the spectrum of the energy, when light is generated in accordance with energy transferred by reaction between the energy generated from the one or more radioactive elements and a scintillator, channels are divided by a number of photons collected by a photomultiplier, and the energy transferred by radiation is compared with the number of the collected photons to perform energy correction.

6. The method for distinguishing radionuclides according to claim 1, wherein the energy value of the Compton edge corresponds to gamma energy of the radioactive element.

7. An apparatus for distinguishing radionuclides, comprising:
an input unit configured to receive energy released from a radioactive element;
a control unit including a plastic scintillator configured to release light by using the received energy as an input; and
an output unit configured to output a radionuclide of the radioactive element,
wherein the control unit obtains energy spectrum on a basis of the light released from the scintillator, calculates an energy-weighted count by applying a weight for each channel to the energy spectrum, and determines the radionuclide of the radioactive element when an energy value of a peak value of the radioactive element in the energy-weighted count corresponds to an energy value of Compton edge, and
wherein the energy-weighted count is a spectrum graph in which an x axis signifies an energy value of the radioactive element and an y axis signifies an energy-photon count value obtained by multiplying the energy value of the radioactive element by a photon count.

8. The apparatus for distinguishing radionuclides according to claim 7, further comprising:
a memory configured to store energy values of Compton edge of the radionuclides,
wherein the control unit compares the energy value of the peak value of the radioactive element in the energy-weighted count with the energy values of Compton edge of the radionuclides to determine the radionuclide of the radioactive element.

9. The apparatus for distinguishing radionuclides according to claim 8, wherein the energy value of Compton edge is an energy value of Compton edge corresponding to gamma energy of the radioactive element.

10. The apparatus for distinguishing radionuclides according to claim 7, wherein the control unit distinguishes one radioactive element or a plurality of radioactive elements.

11. The apparatus for distinguishing radionuclides according to claim 7, wherein the output unit includes a display unit configured to display information regarding the radionuclide of the radioactive element to a user.

12. The apparatus for distinguishing radionuclides according to claim 7, wherein the energy value of the peak value of the radioactive element is an x axis value in the spectrum graph of the energy-weighted count.

13. The apparatus for distinguishing radionuclides according to claim 7, wherein the input unit receives energy of gamma-ray generated from the radioactive element.

14. The apparatus for distinguishing radionuclides according to claim 7, wherein the control unit obtains the energy spectrum by measuring each of a test source and a background, correcting the energy with respect to the measured test source, measuring a target source on a basis of the measured background, and removing the background.

15. The apparatus for distinguishing radionuclides according to claim 7, wherein the control unit obtains the energy spectrum by dividing, when light is generated in accordance with energy transferred by reaction between the energy generated in the radioactive element and the scintillator, channels by a number of photons collected by a photomultiplier, and comparing the energy transferred by radiation with the number of the collected photons to perform energy correction.

* * * * *